Sept. 15, 1953 G. G. KEARFUL 2,651,802
ELECTRIC WINDSHIELD WIPER
Filed June 10, 1946 2 Sheets-Sheet 1

Inventor
Godfrey G. Kearful
By Blackmore, Smeeth & Hunt
Attorneys

Sept. 15, 1953        G. G. KEARFUL        2,651,802
ELECTRIC WINDSHIELD WIPER
Filed June 10, 1946        2 Sheets-Sheet 2
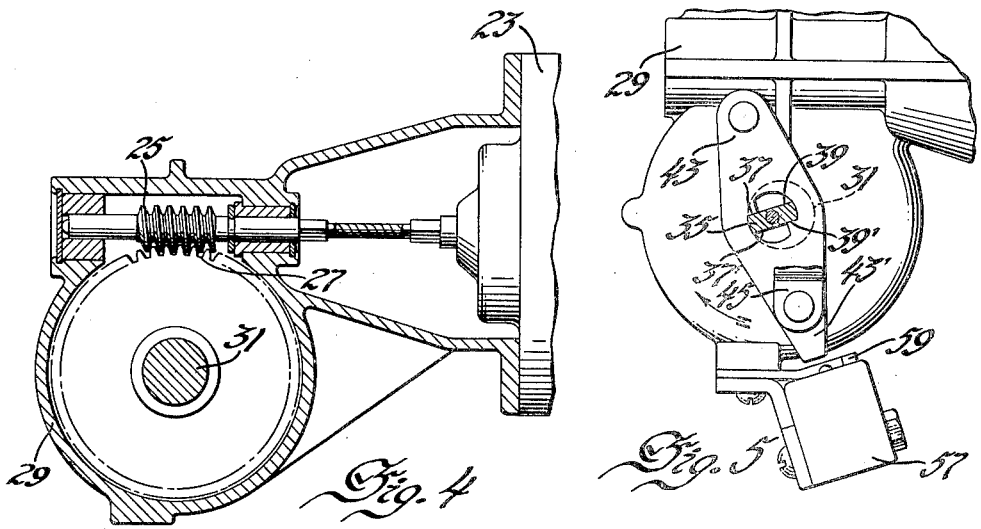
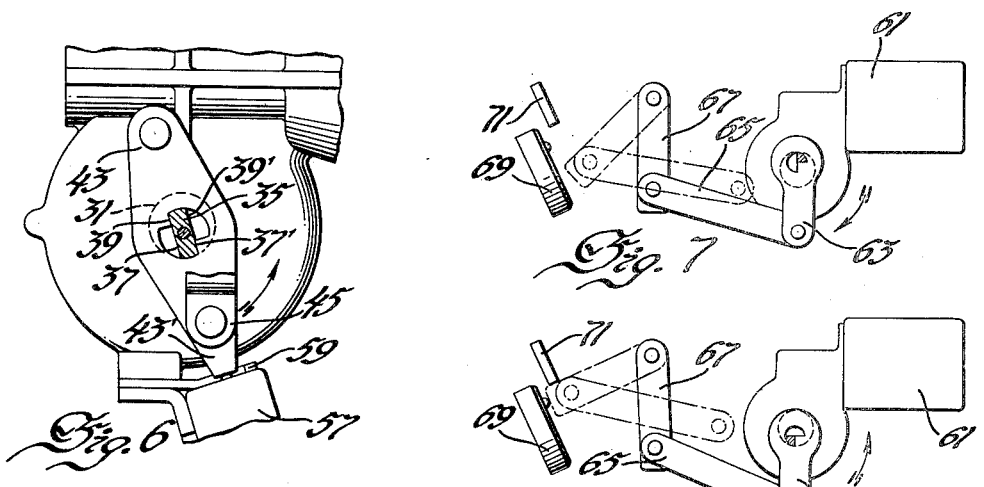
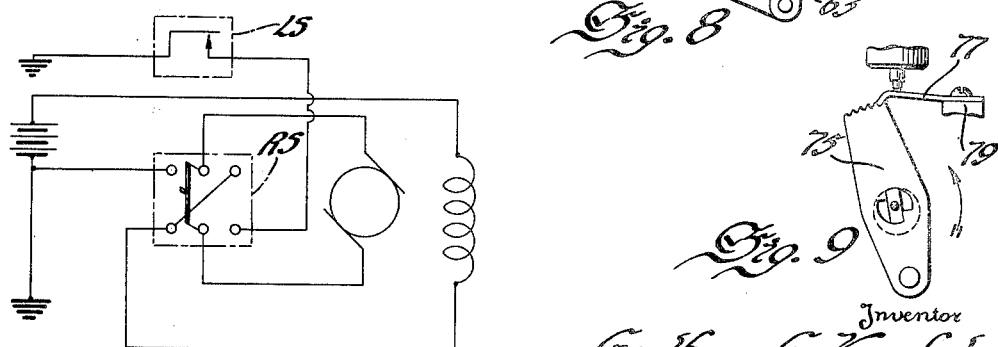
Inventor
Godfrey G. Kearful
By Blackmon, Spencer & Hint
Attorneys Patented Sept. 15, 1953

2,651,802

UNITED STATES PATENT OFFICE 2,651,802

ELECTRIC WINDSHIELD WIPER

Godfrey G. Kearful, Saginaw, Mich., assignor to General Motors Corporation, Detroit, Mich., a corporation of Delaware Application June 10, 1946, Serial No. 675,539

19 Claims. (Cl. 15—253)

1

This invention relates to windshield wipers for motor vehicles and is the result of efforts to improve the mechanism by which an electric motor rocks the arm and blade assembly and may move it to a parked position out of the range of vision of the operator.

An object of the invention is to provide means whereby, in response to a reversal of current through a reversible electric motor, a rotating driving crank may have its effective length changed so that it may operate a limit switch and cut off the supply of energy to the motor. As a further object, the invention provides a positive stop to limit the motion of the crank after the supply of current is cut off, the position of the stop corresponding to the desired parking position of the blade and arm.

Other objects will be understood from the description which follows.

On the accompanying drawings:

Fig. 1 is a view in elevation of a divided windshield which is being cleaned by two wipers. Full lines show the blades in parked position. A dotted line is used to show one limiting position of the blade in normal operation.

Fig. 4 is a vertical section of a worm assembly driven by the motor, the section being indicated by lines 4—4 on Fig. 3.

Fig. 5 shows in elevation the novel motor driven crank, the figure illustrating the limit switch and the position of the crank relative thereto for normal operation.

Fig. 6 is a similar view and shows the changed relative position of the crank and limit switch when the motor is reversed.

Fig. 7 shows in elevation a modification wherein a limit switch and stop is associated with an oscillating arm driven by the motor driven crank.

Fig. 8 is a similar view showing the oscillating arm as having operated the limit switch and reached a stop.

Fig. 9 is a view in elevation of a more recently designed crank, switch and stop assembly.

Fig. 10 is a diagram representing one form of reversible motor.

Figure 1:
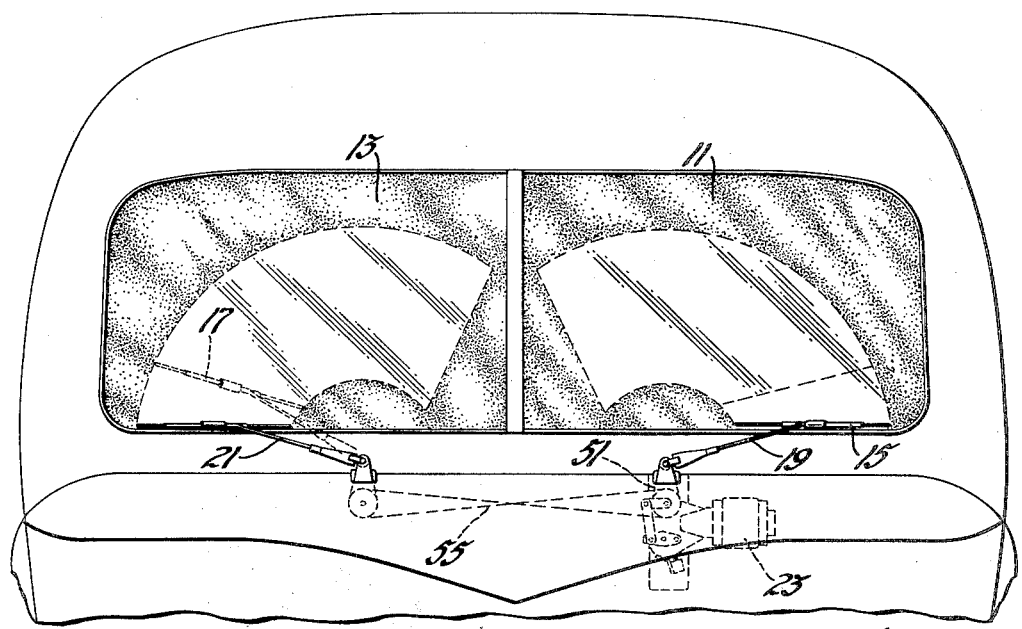

A front view of a motor vehicle appears in Figure 1 wherein windshield glasses 11 and 13 are cleaned by blades 15 and 17 carried by arms 19 and 21. The power for the oscillation of the arms is obtained from a motor shown in dotted lines at 23. The motor shaft rotates a worm 25

2 geared to a worm gear 27 the gearing being housed by a casing 29. The worm gear is mounted on a shaft 31 journalled at 33. On the end of the shaft 31 is an eccentric 35 in the form of a driving lug having flat side faces with opposed end face portions 37, 37', 39, 39' and circular ends 38 and 38' as shown by Fig. 5 and Fig. 6. These figures show by dotted lines the outline of shaft 31 from which the eccentric driving lug 35 extends. The driving crank 43 has an opening 44 having a circular shape with a pair of opposed shoulders 48 and 48' within the opening as shown by Fig. 5 to limit the movement of the crank 43 relative to the shaft 31 to 90°. When the shaft 31 rotates clockwise as shown by the arrow, the faces 37 and 39' of the lug engage the shoulders within the opening 44 as shown in Fig. 5. These are the relative positions of the driving lug and crank for normal wiper operation wherein the extremity 43' is in a position nearest to the center of shaft 31 to clear limit switch 57 and stop 59. Arm 41 secured to crank 43 by rivets 42 has a round hole 46 concentric with opening 44 in crank 43 running on a round portion of shaft 31 concentric with eccentric lug 35 or running on the circular ends 38 and 38' of the eccentric lug. This prevents flatted end or eccentric lug 35 of the shaft from binding in arm 43 when the shaft is reversed.

Figure 2:
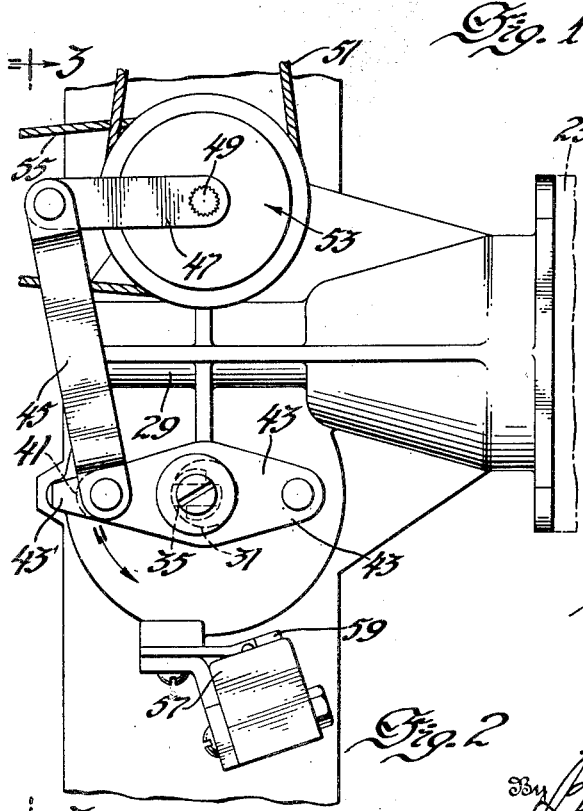
Fig. 2 is a view in elevation of the operating means between the motor and the blade arm.
Figure 3:
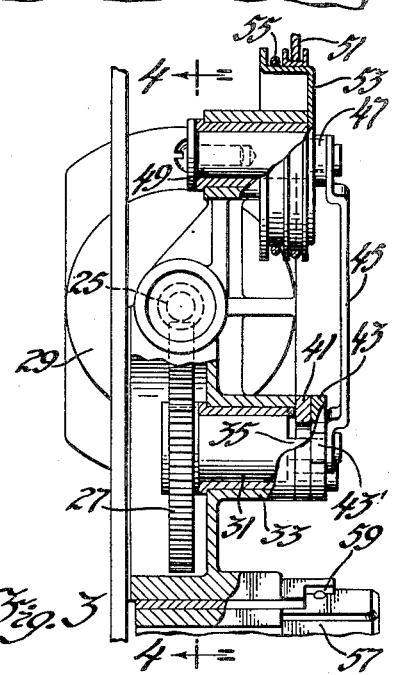
Fig. 3 is a view as seen from line 3—3 of Fig. 2.

As shown by Fig. 2 and Fig. 3 the rotating crank 43 is connected by a link 45 to the arm 47 on a rockshaft 49. The dimensions are such that complete rotation of shaft 31 is accompanied by a limited oscillation of shaft 49. The oscillation of shaft 49 is used to oscillate the wiper arm 19. To get the desired amplitude of oscillation it may be found desirable to couple the wiper arm shaft with shaft 49 by a cable such as 51 operating from a double drum 53 on shaft 49. In the present disclosure there is also a cable 55 on a second part of drum 53. This cable is crossed and embraces a drum shown in dotted lines beneath the shaft of arm 21. By this means the two blades swing in opposite directions. Normally the outer limit of their ranges will be understood from the dotted line positions as shown by Fig. 1. The parked position is shown by full lines.

If the parts are in the position shown by Fig. 5 the arms operate through the normal range. If the motor is reversed, shaft 31 and its driving lug rotate in an opposite direction and the driving lug faces 37' and 39 engage the opposed faces of the cutout part or shoulders 48 and 48' of crank 43. In doing so the crank is projected or cammed to some extent radially so that the link 45 oscillates arm 47 through a longer arc and the blades swing to the parking position. However, as the crank rotates its projected end 43' which previously cleared a limit switch 57 now engages that switch and cuts off the current to the motor. There is, of course, more or less coasting of the blade and arm so that it is deemed best to positively stop the coasting blade and arm. To this end the limit switch cuts off the current at a time corresponding to a position of the blade arm where it is closely adjacent the desired parking position and the arm is made to stop at just the desired position by locating the positive stop 59 relative to the crank as shown. A windshield wiper will coast to a variable extent depending upon the condition of the glass. The positive stop is located so that it stops the coasting at less than a predetermined minimum of coasting so that the desired parking is made certain.

In Fig. 7 and Fig. 8 is shown a form differing from that described above in that the limit switch 57 and stop are located just beyond the end of the normal movement of an oscillating arm like arm 47 of Fig. 2. In these two figures the motor 61 rotates crank 63 as before. Crank 63 has the same movement relative to the driven worm shaft as has been described above. A link 65 connects crank 63 to rock shaft arm 67. The limit switch is marked 69 and the stop 71. When the motor crank 63 rotates in the direction of the arrow shown by Fig. 7, the end of arm 67 fails to reach the switch. When the motor is reversed, the crank has its effective length increased and the rockshaft arm operates the limit switch and as it coasts it is stopped at 71 as shown by Fig. 8.

In Fig. 9 there is shown a recently developed substitute for the kind of limit switch and stop shown by the other figures. Here the crank 75 rotating in the direction to operate the switch has teeth which engage a yieldable member 77 secured at one end 79. The teeth of the crank engage part 77 progressively and operate the switch as they do so. In passing over the humps between the teeth the plunger of the limit switch may move under the influence of yielding means not shown, beyond the position necessary to open the switch. When the spring 77 rides over the teeth or serrations of cam 75, more power is absorbed than when the spring rides over the smooth cam face. Thus there is a gradual braking effect on the cam 75 which will reduce the impact when the cam hits the stop or may be used to entirely eliminate the stop if sufficient teeth are employed to insure a full stop under all operating conditions.

In Fig. 10 there is shown a diagram of the motor winding. No invention is claimed for this disclosure. Any motor, series or shunt, may be used provided only that it be reversible. In the circuit as shown the limit switch is marked L. S. The manual reversing switch is marked R. S. The armature, field, battery and ground are, of course, conventional.

I claim:

1. In windshield wiper operating mechanism, a reversible motor, reduction gearing including a slow speed gear rotated by said motor, a shaft driven by said slow speed gear, a crank carried by said shaft, said crank having a backlash connection with said shaft consisting of an eccentric cam surface with abutment means at both ends on one and cooperating cam and abutment engaging means on the other whereby reversal of said motor and gearing changes the radial projection of said crank, a rockshaft having a lever arm and a link between said lever arm and said crank and means associated with said rockshaft to oscillate a wiper arm.

2. The invention defined by claim 1, together with a limit switch adapted to be operatively engaged by said crank to cut off electric current to the motor while the crank is moving in its extreme projected position in response to a reversal of said motor.

3. The invention defined by claim 1, together with a limit switch adapted to be operatively engaged by said crank to cut off electric current to the motor while the crank is moving in its extreme projected position in response to a reversal of said motor and a stop to be engaged by said crank to locate the wiper blade in an extreme position out of the range of vision of the operator.

4. In combination, a reversible motor, a member rotated thereby, said member having a shaft, a crank mounted on said shaft having a backlash connection with said shaft consisting of an eccentric cam and abutment means on one of said shaft and crank and cooperating cam and abutment engaging means on the other to shift said shaft between to two positions, a first of lesser radial extent and a second of greater radial extent in response to motor reversal, connections from said crank to a windshield wiper blade whereby the latter may swing through a lesser amplitude while the crank is in its first position and through a greater amplitude when the crank is in its second position.

5. In windshield wiper operating mechanism, a reversible motor, reduction gearing driven thereby, said gearing including a slow speed gear element having a shaft, a crank on said shaft having a backlash relation thereto whereby in response to reversal of said motor said crank may assume a first position of lesser radial extent and a second position of greater radial extent, connections from said crank to said windshield wiper whereby the wiper has a greater amplitude of oscillation when the crank is operating in its second position, and a limit switch adapted to be operatively engaged by said crank at that point in its rotation corresponding to a position of the wiper near the end of its arc of greater amplitude.

6. In windshield wiper operating mechanism, a reversible motor, reduction gearing driven thereby, said gearing including a slow speed gear element having a shaft, a crank on said shaft having a backlash relation thereto whereby in response to reversal of said motor said crank may assume a first position of lesser radial extent and a second position of greater radial extent, connections from said crank to said windshield wiper whereby the wiper has a greater amplitude of oscillation when the crank is operating in its second position, a limit switch adapted to be operatively engaged by said crank at that point in its rotation corresponding to a position of the wiper near the end of its arc of greater amplitude and a positive stop adjacent said limit switch to stop the crank and to thereby stop the wiper at the end of arc of greater amplitude.

7. In windshield wiper operating mechanism, a reversible motor, reduction gearing driven thereby, said gearing including a slow speed gear element having a shaft, a crank on said shaft having a backlash relation thereto whereby in response to reversal of said motor said crank may assume a first position of lesser radial extent and a second position of greater radial extent, connections from said crank to said windshield wiper whereby the wiper has a greater amplitude of oscillation when the crank is operating in its second position, and a limit switch and a stop adapted to be beyond the outer end of said crank while in said first position but to be operatively engaged by said crank when moving in its second position.

8. In windshield wiper operating mechanism, a reversible motor, reduction gearing driven thereby, said gearing including a slow speed gear element having a shaft, a crank on said shaft having a backlash relation thereto whereby in response to reversal of said motor said crank may assume a first position of lesser radial extent and a second position of greater radial extent, connections from said crank to said windshield wiper whereby the wiper has a greater amplitude of oscillation when the crank is operating in its second position, and a limit switch and a stop adapted to be beyond the outer end of said crank while in said first position but to be operatively engaged by said crank when moving in its second position, and said crank having serrations, said stop yieldably engaged by said serrations and also engaging said limit switch.

9. In combination, a reversible motor, a member rotated thereby, said member having a shaft, a crank mounted with backlash on said shaft and shiftable to two positions, a first of lesser radial extent and a second of greater radial extent in response to motor reversal, connections from said crank to a windshield wiper blade whereby the latter may swing through a lesser amplitude while the crank is in its first position and through a greater amplitude when the crank is in its second position, and a limit switch and stop adapted to stop the motor and stop the wiper at one end of its oscillation of greater amplitude.

10. In combination, a reversible motor, a member rotated thereby, said member having a shaft, a crank mounted with backlash on said shaft and shiftable to two positions, a first of lesser radial extent and a second of greater radial extent in response to motor reversal, connections from said crank to a windshield wiper blade whereby the latter may swing through a lesser amplitude while the crank is in its first position and through a greater amplitude when the crank is in its second position, a limit switch and a stop positioned to be beyond the outer end of said crank while in said first position but to be operatively engaged by said crank when moving in its second position, and said crank having serrations, said stop yieldably engaged by said serrations and also engaging said limit switch.

11. In combination, a reversible motor, a member rotated thereby, said member having a shaft, a crank having an aperture with a cam and stop contour mounted on said shaft, means on said shaft engaging said cam and stop to shift said crank to two positions, a first of lesser radial extent and a second of greater radial extent in response to motor reversal, means on said shaft engaging said cam and stop to shift said crank between said two positions and to stop said crank at either of said positions, and connections from said crank to a windshield wiper blade whereby the latter may swing through a lesser amplitude while the crank is in its first position and through a greater amplitude when the crank is in its second position.

12. In windshield wiper operating mechanism, a reversible motor, reduction gearing driven thereby, said gearing including a slow speed gear element having a shaft, a crank on said shaft having a backlash relation thereto whereby in response to reversal of said motor said crank may assume a first position of lesser radial extent and a second position of greater radial extent, cam and stop means on said crank, means on said shaft engaging said cam to shift said crank to either of said first and second positions and engaging said stop means to stop said crank at either of said positions, and connections from said crank to said windshield wiper whereby the wiper has a greater amplitude of oscillation when the crank is operating in its second position.

13. In combination, a reversible motor, a member rotated thereby, said member having a shaft, a crank having a backlash connection with said shaft consisting of an eccentric cam surface with abutment means at both ends on one and cooperating cam and abutment engaging means on the other to shift said shaft between two positions, a first of lesser radial extent and a second of greater radial extent in response to motor reversal, interengaging means on said shaft and crank to shift said crank from one position to another and to drive said crank, and connections from said crank to a windshield wiper blade whereby the latter may swing through a lesser amplitude while the crank is in its first position and through a greater amplitude when the crank is in its second position.

14. A windshield wiper mechanism including in combination, a reversible motor, a member rotated thereby, drive means mounted on said member having a backlash connection with said member consisting of an eccentric cam and abutment means on one of said member and drive means and cooperating cam and abutment engaging means on the other to shift said member between two positions, a first of lesser radial extent and a second of greater radial extent in response to motor reversal, and connections from said drive means to a driven member whereby the latter may swing through a lesser amplitude while the drive means is in its first position and through a greater amplitude when the drive means is in its second position.

15. In the combination defined in claim 14 said abutment means comprising an abutment at both ends of said cam.

16. The combination defined in claim 13 and said shaft and crank rotating relative to each other during movement between said two positions and cooperating guide means on said shaft and said crank to guide said crank and shaft during rotation to prevent binding of said eccentric cam and cooperating cam engaging means.

17. The combination defined in claim 14 and said shaft and crank rotating relative to each other during movement between said two positions and cooperating guide means on said shaft and said crank to guide said crank and shaft during rotation to prevent binding of said eccentric cam and cooperating cam engaging means.

18. The combination defined in claim 13 and said eccentric cam surface consisting of a portion of the edge of an eccentric circular aperture, said abutment means consisting of two diametrically opposed projections extending from said cam surface into the aperture from diametrically opposed sides thereof and said cooperating cam and abutment engaging means consisting of an eccentric lug transversely fitting in said aperture and having a width less than the distance between said projections.

19. The combination defined in claim 14 and said eccentric cam surface consisting of a portion of the edge of an eccentric circular aperture, said abutment means consisting of projections extending from said cam surface into the aperture and said cooperating cam and abutment engaging means consisting of an eccentric lug transversely fitting in said aperture and having a width less than the distance between said projections.

GODFREY G. KEARFUL.

References Cited in the file of this patent

UNITED STATES PATENTS

| Number | Name | Date |
|---|---|---|
| 2,153,030 | Venable | Apr. 4, 1939 |
| 2,259,790 | Auten | Oct. 21, 1941 |
| 2,308,212 | Scott-Iverson | Jan. 12, 1943 |